Aug. 13, 1968  G. A. A. HOULTON  3,396,861
STRADDLE CARRIER VEHICLES
Filed Dec. 10, 1965  5 Sheets-Sheet 1

Inventor
GEORGE A. A. HOULTON
By Young + Thompson
Attorneys

Aug. 13, 1968  G. A. A. HOULTON  3,396,861
STRADDLE CARRIER VEHICLES
Filed Dec. 10, 1965  5 Sheets-Sheet 3

Inventor
GEORGE A. A. HOULTON
By Young + Thompson
Attorneys

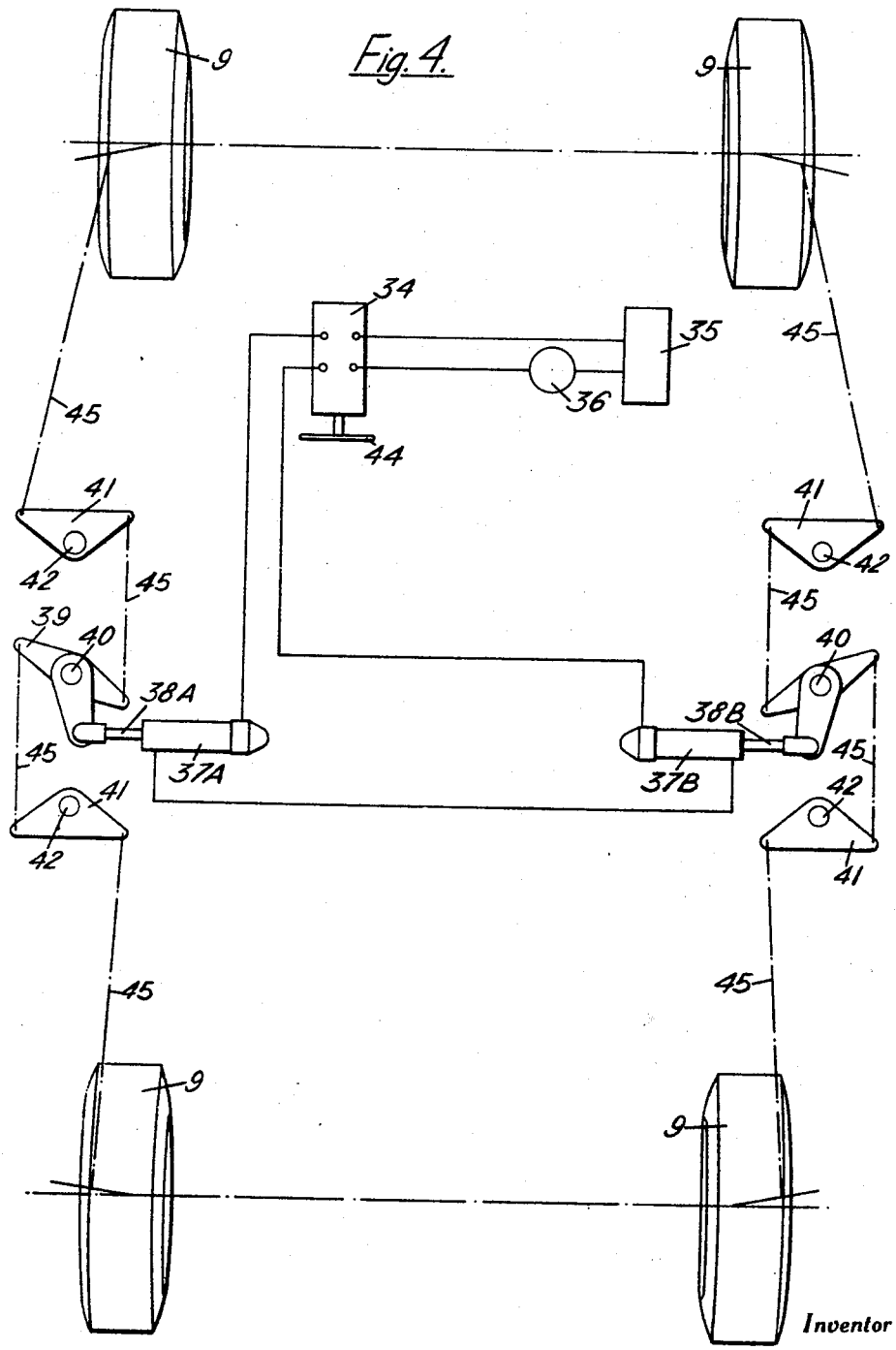

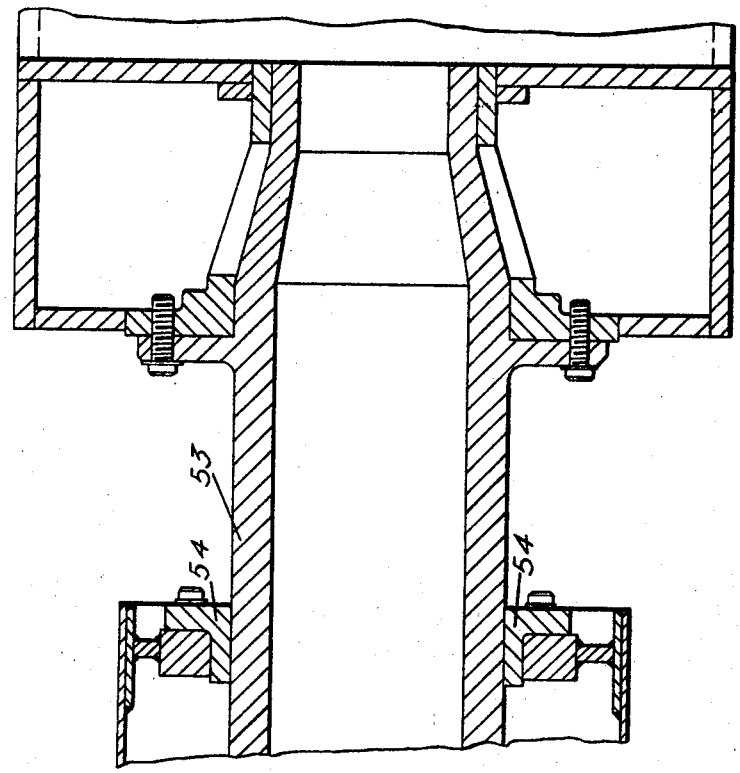
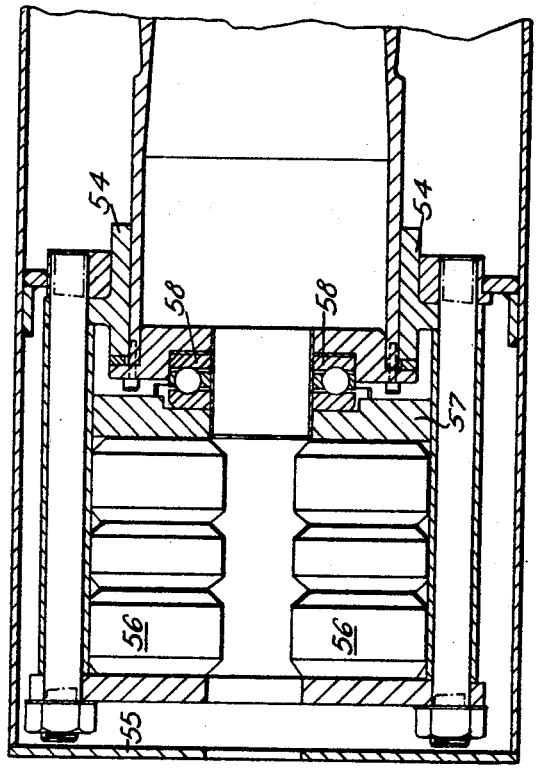
Fig. 6

United States Patent Office 3,396,861
Patented Aug. 13, 1968

3,396,861
STRADDLE CARRIER VEHICLES
George A. A. Houlton, Newtownards, County Down, Northern Ireland, assignor to British Straddle Carrier Company Limited, Newtownards, County Down, Northern Ireland, a British company
Filed Dec. 10, 1965, Ser. No. 512,934
9 Claims. (Cl. 214—392)

ABSTRACT OF THE DISCLOSURE

A straddle carrier vehicle comprises a lower chassis and a relatively vertically movable upper chassis which in turn carries a relatively vertically movable lift assembly to engage the load. The lift assembly and the upper chassis are selectively individually movable relative to each other and to the lower chassis. The operator's cab is mounted on the upper chassis for better visibility.

---

This invention relates to straddle carrier vehicles especially, but not exclusively for use in stacking articles or placing articles on to a higher plane, for example loading on to a lorry or trailer.

The present invention is a straddle carrier vehicle including a lower chassis mounting ground engaging wheels, an upper chassis vertically movable relative to the lower chassis, a lift assembly to engage a load to be lifted, the lift assembly being mounted on the upper chassis and movable vertically both therewith and relative thereto, a primary lift mechanism to move the lift assembly relative to the upper and lower chassis and a secondary lift mechanism to move the upper chassis and lift assembly relative to the lower chassis.

Preferably, a control cabin is located on the upper chassis having flexible connections to control the drive and steering of the ground engaging wheels and operation of the lift assembly and lift mechanisms.

Preferably also, a motor to actuate the primary and secondary lift mechanisms is located on the upper chassis.

Figure 1:
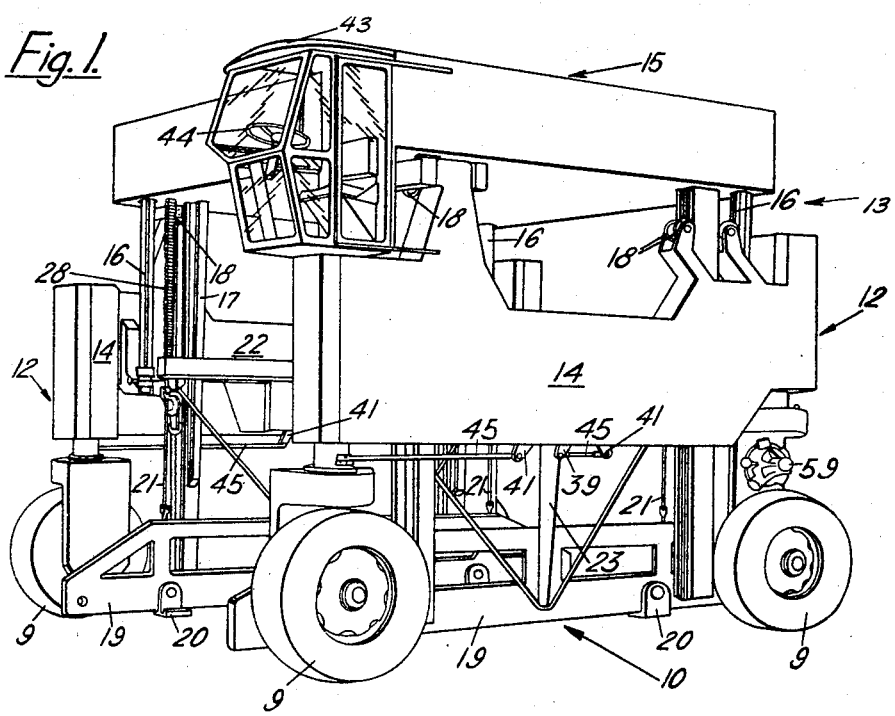
Figure 5:
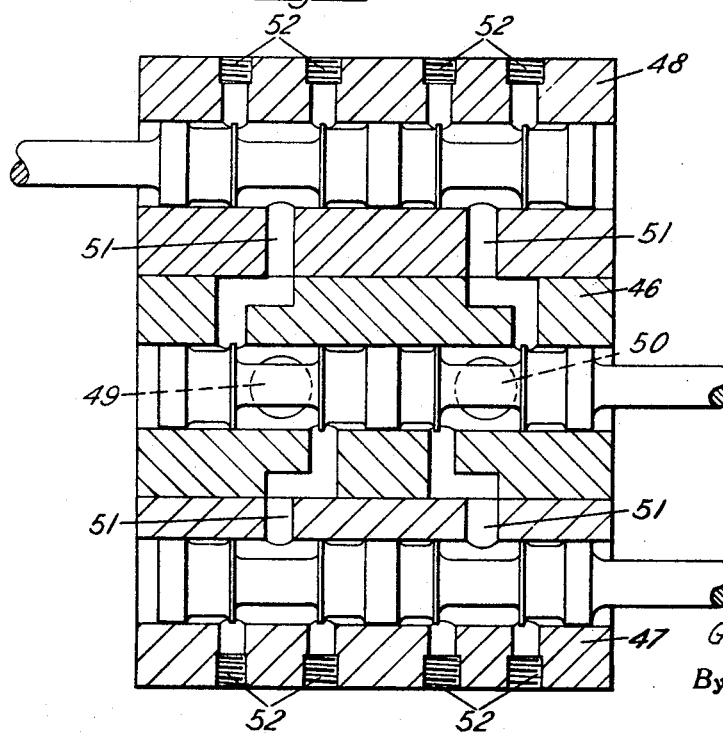
Figure 2:
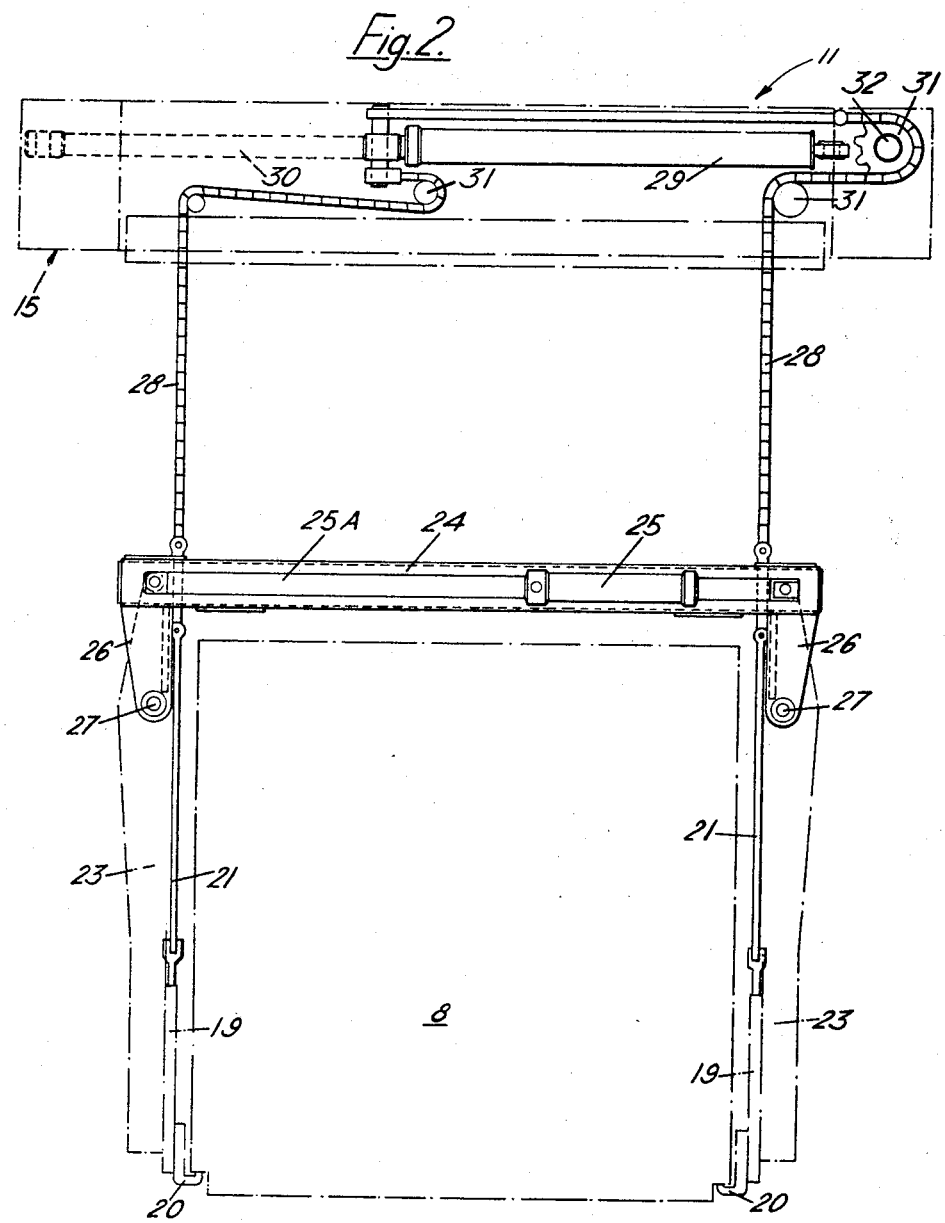
Figure 3:
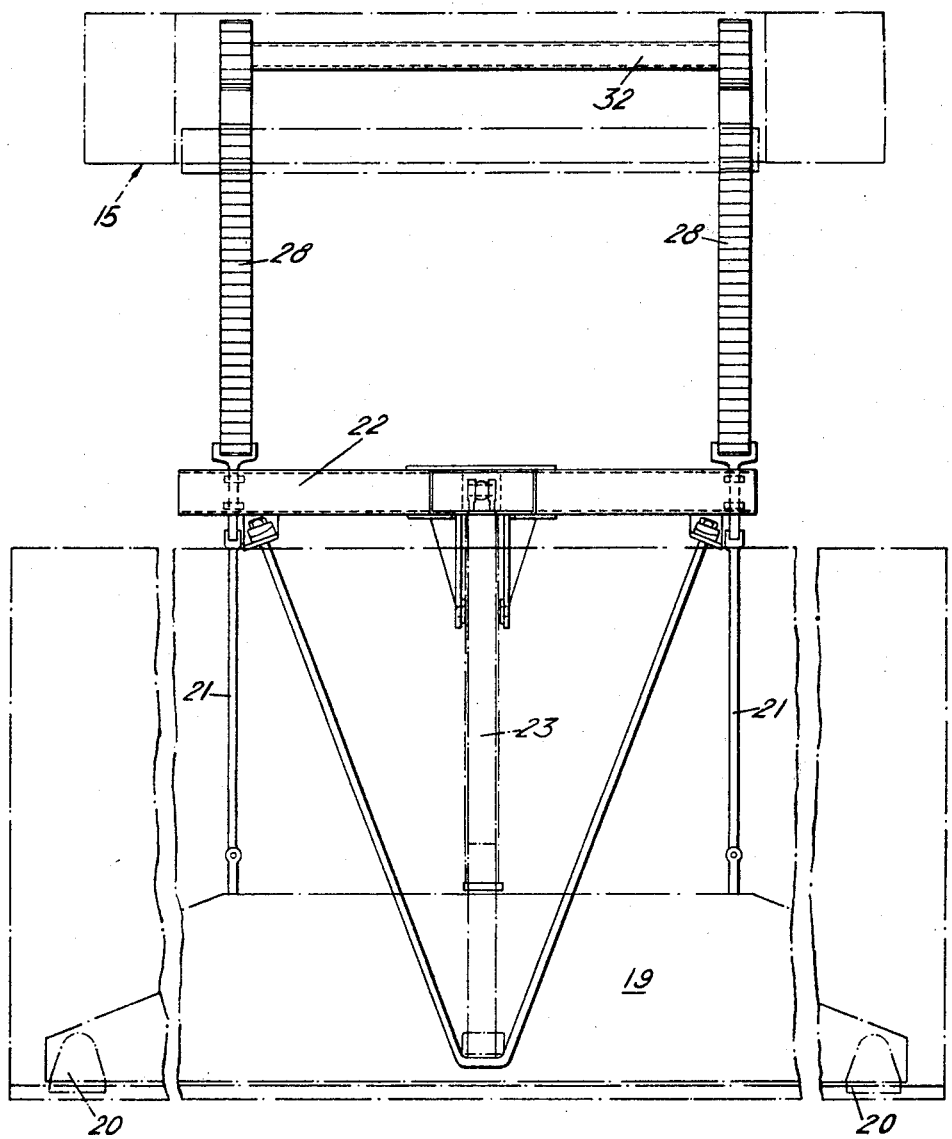

An embodiment of the present invention will now be described with reference to the accompanying drawings in which:

FIG. 1 is an isometric view of a straddle carrier according to the present invention, FIG. 2 is a front sectional view of a lift assembly and a primary lift mechanism, FIG. 3 is a side elevational view of the lift assembly and the primary lift mechanism, FIG. 4 is a diagrammatic view of a steering assembly, FIG. 5 is a part sectional view of a valve assembly, and FIG. 6 is a sectional view of a wheel suspension according to the present invention.

Referring to FIG. 1, a straddle carrier includes a lift assembly 10 for engaging a container 8 (FIG. 2), a primary lift mechanism 11 to raise the container 8 and assembly 10 a predetermined distance from the ground and within the confines of a lower chassis 12, and a secondary lift mechanism 13 to raise further the container 8 and assembly 10 a predetermined distance from the ground such as would enable the container to be placed on a platform, lorry, trailer or the like, or stacked in another container.

The lower chassis 12 includes two transversely spaced side members 14 each mounting longitudinally spaced ground engaging wheels 9, the space between the members 14 being for location of a load to be lifted.

An upper chassis 15 is mounted on the lower chassis 12 by four hydraulically operable rams 16 which are rectangularly located on the lower chassis 12, two on each side member 14, and by four guide posts 17 rectangularly spaced on the upper chassis 15, two guide posts 17 depending into each side member 14 of the lower chassis 12.

The upper chassis 15 is movable vertically relative to the lower chassis 12 between a lower or "normal" position and an upper or "raised" position. The posts 17 each run in a set of two pairs of opposed pulley wheels 18 on the lower chassis 12.

The lift assembly 10 (FIGS. 1 to 3) includes two transversely spaced plates 19, located in the space between the inner faces of the side members 14 of the lower chassis 12. Each plate 19 has two hooks 20 correspondingly spaced on the inner faces of the plates 19 at a position nearest ground level. Each plate 19 is suspended by links 21 from a support 22, and is fixedly held in a predetermined position by a pivotable arm 23. The supports 22 are secured together by a crossbar 24 housing an hydraulic ram 25 each end of which is attached to one end of each pivotable arm 23. An arm 26 is secured to each end of the crossbar 24 and depends therefrom to adjoin the pivotable arm 23 in a pivot 27.

The primary lift mechanism 11 includes four chains 28 arranged to operate in longitudinally spaced pairs. One end of each chain in the pair is secured adjacent to the ends of the corresponding support 22. The other ends of the chains 28 are attached in transversal pairs to one end of hydraulic rams 29. The ram mounts an extensible limb 30 and one end of one chain is connected to one side of the extensible limb 30. The other end of the other chain in the transversal pair is connected to the diametrically opposite side of the limb 30.

The chains 28 are movable over sprocket wheels 31 which are eight in number and are of four sizes, two wheels of one size being linked by a longitudinal axle 32. The sprocket wheels 31 are linked by the axle 32 such that the vertical movement of the chains 28 are the same when the rams 29 are actuated. The chains 28 in each longitudinal pair move over sprocket wheels 31 of the same size. The rams 29 are located in the upper chassis.

The secondary lift mechanism 13 which raises the upper chassis, lift assembly and primary lift mechanism 11 relative to the lower chassis 12 includes the four hydraulic rams 16 and an hydraulic system including a valve assembly for synchronising the vertical movement of the rams 16.

The valve assembly (FIG. 5) includes three flow divider valves, one valve 46 being mechanically operable by a difference in height between the two transverse sides of the upper chassis 15, a second valve 47 which is mechanically operable by a difference in height between the rams 16 of one longitudinal pair, and a third 48 being mechanically operable by a difference in height between the rams 16 of the other longitudinal pair.

A pipe 49 communicates with the valve 46 to introduce fluid under pressure into the valve, and a pipe 50 is provided to carry away the used fluid.

Passages 51 are provided to allow fluid to pass into the valves 47, 48. The hydraulic system connects the outlets 52 of the valves 47, 48 to the four rams 16. Eight non-return valves are used in the system, one in a supply pipe to each ram 16 and one in a return pipe from each ram 16. A sensing mechanism (not shown) is provided to actuate the valves.

Referring to FIG. 4 control of the steering is effected by an hydraulic system the motion of which is mechanically relayed to the wheels 9. The steering assembly includes a steering unit 34 in communication with a reservoir 35, a pump 36 and two hydraulic rams 37A, 37B which rams are also in communication with each other. One ram 37A controls the movement of one longitudinal pair of wheels 9, and the other ram 37B controls the movement of the other longitudinal pair of wheels 9. The actuation of the rams 37A, 37B is transferred to the wheels 9 by extensible limbs 38A, 38B respectively, each limb being coupled to a plate 39 pivoted at a point 40. Each plate 39 is mechanically linked by linkages 45 through a plate 41 pivoted at point 42 to the respective pair of wheels 9.

Referring to FIG. 6, each wheel 9 is mounted to one end of a tubular shaft 53 whose outer surface is embraced by bearings 54 to allow it to have vertical rotational movement only. The shaft 53 is partially encased by an inverted W-shaped casing 55, and the bearings 54 are secured to the casing 55. Four substantially cylindrical rubber suspension units 56 are housed in the casing 55, one end of each unit 56 abutting the base of the casing 55 and the other end abutting a plate 57. The plate 57 is attached by thrust bearings 58 to the other end of the shaft 53, the thrust bearings 58 allowing rotational movement of the shaft 53 while the plate 57 remains stationary.

Two wheels 9, preferably those at the rear of the carrier, are driven through gearing (not shown) by two hydraulic motors 59 located one on each side member 14 adjacent to the rear wheels 9. The motors 59 are in communication with, and are controlled by, an hydraulic pump (not shown) and an engine (not shown) both located in the upper chassis 15. The wheels 9 at the front of the carrier are freely rotatable.

An operator's control cabin 43 is located on the upper chassis 15 and contains a control panel from which connections are made to the lift mechanisms 11, 13, lift assembly 10 and to the steering and driving mechanisms. The cabin 43 is so positioned as to give the operator good vision of the container to be lifted, and most of the carrier and the area surrounding the carrier.

In use, the straddle carrier can stack loads or place the loads on a higher plane such as on a lorry or trailer. Such loads may be, for example, metal, box-shaped containers of any length up to 30′ and of cross-section of 8′ by 8′. The carrier is driven over the container 8 to be lifted and the lift assembly 10 actuated to engage the container 8, which is then lifted to a height of, for example 4′ 6″ by actuation of the primary lift mechanism 11. The lift assembly 10 is actuated by an extensible limb 25A of ram 25 being partially retracted, and then advanced to bring the hooks 20 into position to engage recesses in the undersides of the containers 8.

The primary lift mechanism 11 is operated by the extensible limbs 30 of rams 29 being advanced to pull the chains 28 over the sprocket wheels 31 to lift the lift assembly 10 and container. The secondary lift mechanism 13 is then actuated to raise the container 8 a further 5′ so that the bottom of the container 8 is above the top of another container located on the ground. The secondary lift mechanism 13 raises the primary lift mechanism 11, the lift assembly 10 and the container 8 on actuation of the rams 16. The straddle carrier can then straddle the other container 8 and place the lifted container 8 on the other container 8.

During the lifting of a container 8 by the secondary lift mechanism, fluid under pressure is pumped into valve 46 which distributes the flow of pressurised fluid into valves 47, 48 and to the rams 16. If one ram 16 lags the rest of the rams 16 in lifting the container 8, the sensing mechanism (not shown) operates the valve, say 47, controlling the ram 16 to stop fluid passing to the other ram 16 on the same transverse side of the carrier, and to allow sufficient fluid to pass to the ram 16 lagging to bring it level with the other ram 16. If the outlet 52 is fully opened to the ram 16 lagging, then the sensing mechanism (not shown) actuates the valve 46 to stop pressurised fluid passing to the rams 16 on the other transverse side of the carrier. Once the lag of the ram 16 is overcome, the valves 46, 47 return to their normal working position shown in the drawing.

When one ram 16 leads the rest, the process is similar in that more pressurised fluid is pumped into the remaining three rams 16 and the fluid is stopped to the leading ram 16 until the evenness of the vertical movement is restored.

During lowering of the container 8, if one of the rams 16 lags the rest, fluid is prevented from passing from the other rams 16, and the opposite is the case if one ram 16 leads the rest.

The steering mechanism operates by the rotation of a steering wheel 44. If the steering wheel 44 is rotated clockwise to turn the vehicle in a right hand side direction, fluid flows from the steering unit to ram 37A. The fluid expelled by the ram 37A by the extensible limb 38A being advanced, is bled to the other ram 37B to retract the extensible limb 38B and therefore the wheels 9 are in suitable arrangement to turn in a right hand direction. Similarly if the steering wheel 44 is rotated anti-clockwise fluid flows to ram 37B, the fluid expelled by the ram 37B by the advancement of the extensible limb 38B flows to the ram 37A to retract the extensible limb 38A, and the wheels 9 are in a suitable arrangement to turn in a left hand direction.

If it is desired to load the container on to a raised platform such as a lorry or trailer, the container may be required to be raised only by the primary lift mechanism 11 as the height of a lorry or trailer floor is normally about 4′ from the ground. The secondary lift mechanism 13 is of course used if greater height is required.

When the upper chassis is in its normal position, the guide posts, being fully located within the lower chassis give the vehicle a substantial rigidity and the vehicle can travel safely on a highway at a speed of about 15 m.p.h.

I claim:

1. A straddle carrier vehicle comprising a lower chassis, a plurality of ground-engaging wheels supporting said lower chassis, an upper chassis supported on said lower chassis, means for moving said upper chassis vertically relative to said lower chassis, said upper and lower chassis together comprising a horizontally extending U-shaped frame whose sides extend vertically a substantial distance above the wheels, said U-shaped frame forming an open longitudinal bay having an unobstructed vertical pocket for straddling a load to be transported by the vehicle, a lift assembly supported by said upper chassis to engage a load to be lifted, and power means mounted on said upper chassis and operable selectively independently from said first-named means to move said lift assembly vertically relative to said upper chassis.

2. A vehicle as claimed in claim 1, said means for moving said lift assembly vertically relative to said upper chassis comprising a plurality of hydraulic rams, a series of sprocket wheels carried by said upper chassis, and a plurality of chains attached to said rams at one end and to said lift assembly at the other end and disposed about said sprocket wheels.

3. A vehicle as claimed in claim 2, said hydraulic rams being substantially horizontally disposed.

4. A vehicle as claimed in claim 3, said means for moving said upper chassis vertically relative to said lower chassis comprising a plurality of upright hydraulic rams.

5. A vehicle as claimed in claim 4, and sensing means for synchronizing the movement of said upright rams.

6. A vehicle as claimed in claim 5, and a plurality of flow-divider valves actuable by said sensing means to lift a said load evenly.

7. A vehicle as claimed in claim 1, each said wheel being mounted on a shaft, and a plurality of rubber suspension units bearing against each said shaft to absorb ground unevenness.

8. A vehicle as claimed in claim 7, and means mounting each said shaft for vertical and rotational movement relative to said lower chassis.

9. A vehicle as claimed in claim 1, and an operator's cab mounted on said upper chassis for vertical movement with said upper chassis relative to said lower chassis, and means in said cab for controlling the operation of the vehicle.

References Cited

UNITED STATES PATENTS

| | | | |
|---|---|---|---|
| 2,229,530 | 1/1941 | South | 91—411 XR |
| 2,467,576 | 4/1949 | Zimmermann | 60—97 |
| 2,916,099 | 12/1959 | Bergmann et al. | 180—79.2 |
| 3,042,422 | 7/1962 | Garnett | 280—96.2 |
| 3,146,903 | 9/1964 | Bjorklund | 214—394 |

ALBERT J. MAKAY, *Primary Examiner.*